Figure 1:
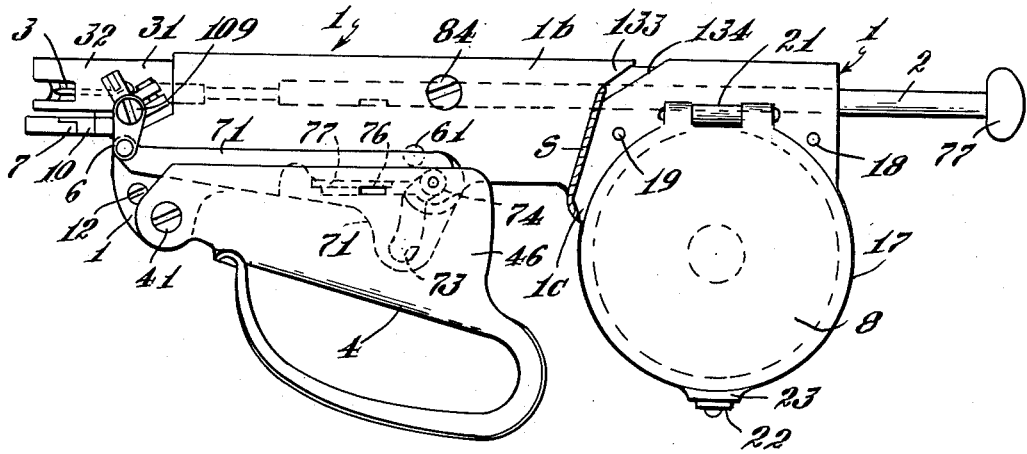

Jan. 3, 1956

C. A. FLOOD 2,729,177

TAG ATTACHING DEVICE

Original Filed Oct. 31, 1951

4 Sheets-Sheet 1

Inventor
Carl A. Flood
by Roberts, Cushman & Grover
Attys

Jan. 3, 1956  C. A. FLOOD  2,729,177
TAG ATTACHING DEVICE
Original Filed Oct. 31, 1951  4 Sheets-Sheet 2
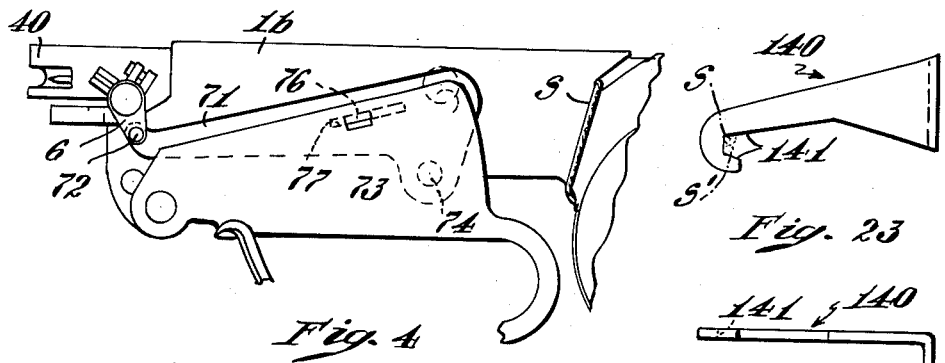
Fig. 4
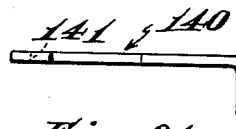
Fig. 23
Fig. 24
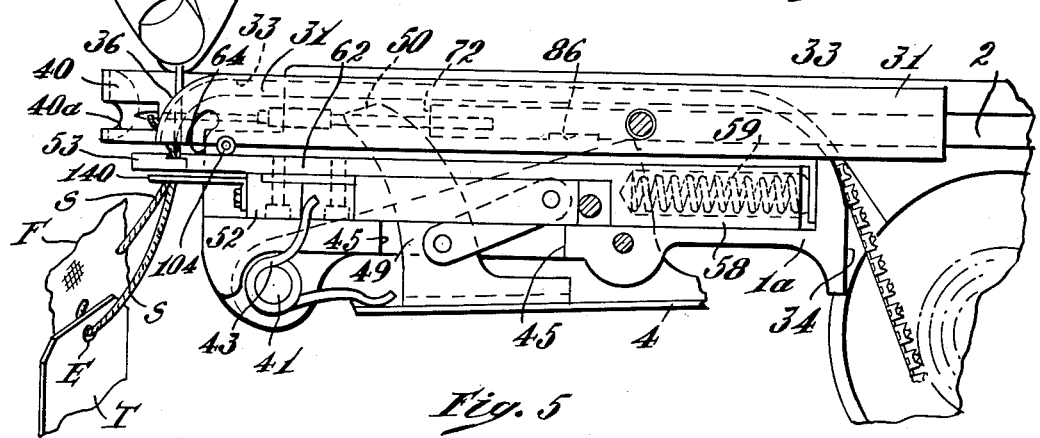
Fig. 5
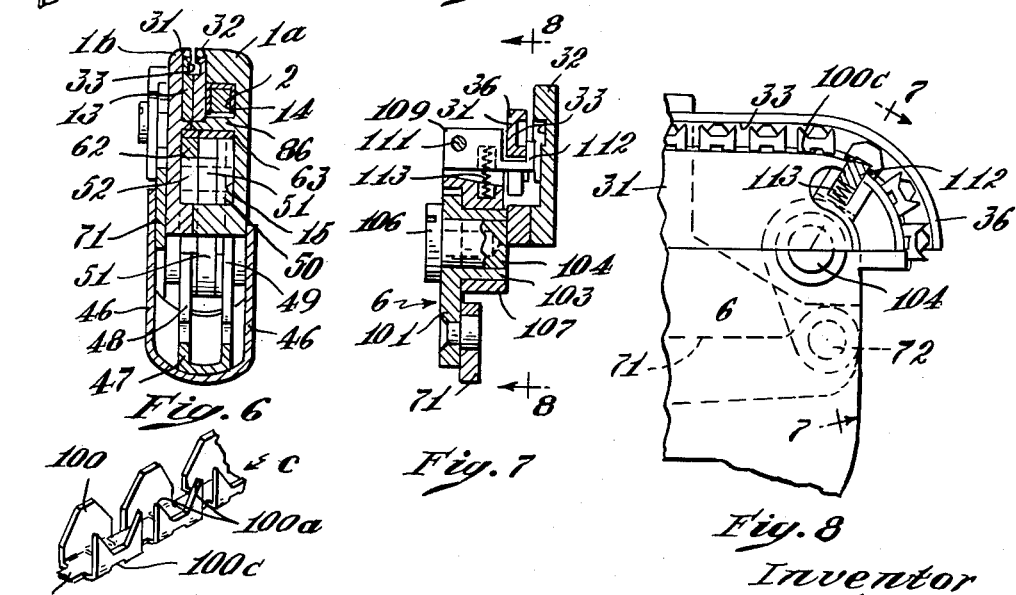
Fig. 6  Fig. 7  Fig. 8
Fig. 9
Inventor
Carl A. Flood
by Robert, Cushman & Grover
Attys Jan. 3, 1956  C. A. FLOOD  2,729,177
TAG ATTACHING DEVICE
Original Filed Oct. 31, 1951  4 Sheets-Sheet 3

Inventor
Carl A. Flood
by Roberts, Cushman & Grover
Att'ys

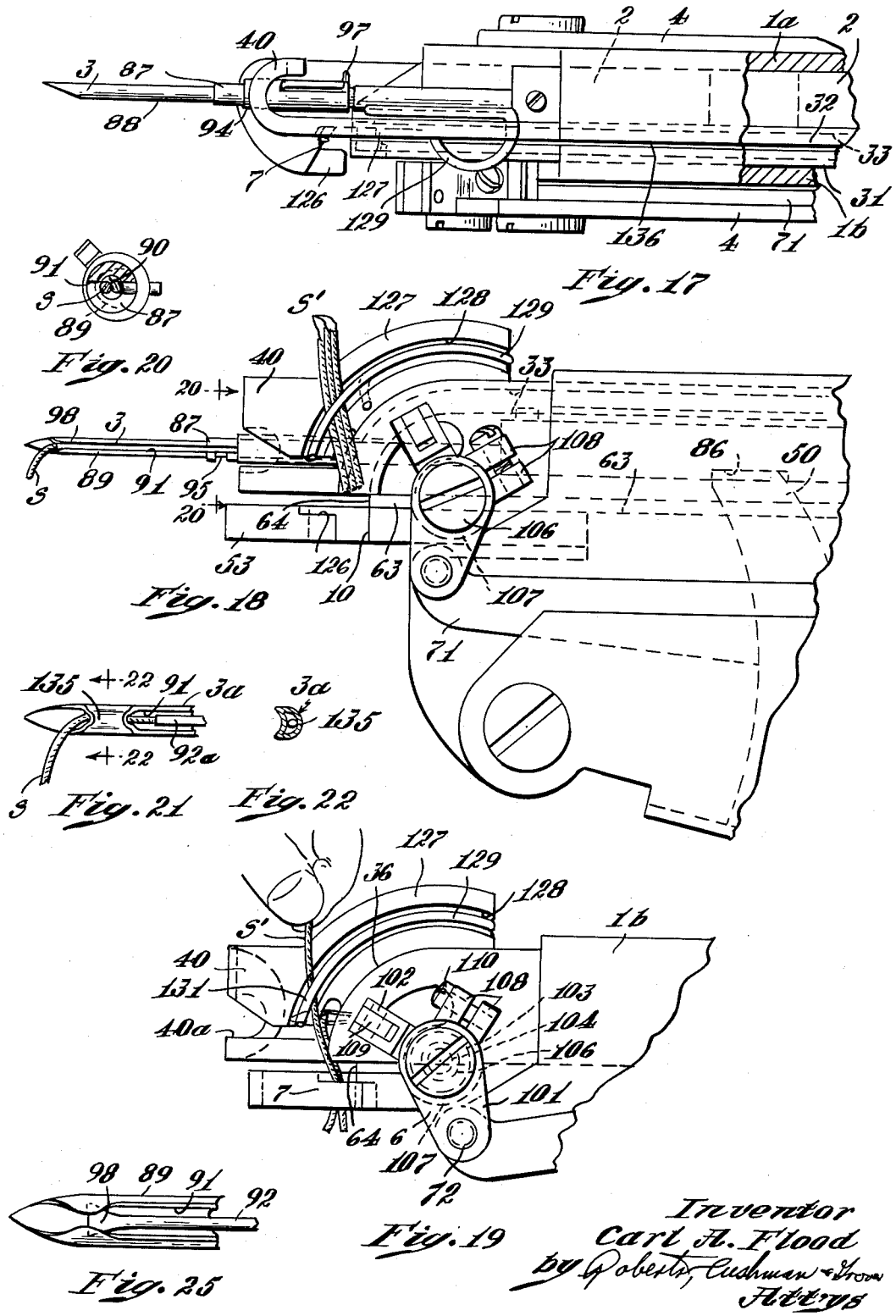
Jan. 3, 1956 — C. A. FLOOD — 2,729,177
TAG ATTACHING DEVICE
Original Filed Oct. 31, 1951 — 4 Sheets-Sheet 4
Inventor
Carl A. Flood

# United States Patent Office 2,729,177
Patented Jan. 3, 1956

2,729,177

TAG ATTACHING DEVICE

Carl A. Flood, Framingham, Mass., assignor to Dennison Manufacturing Company, Framingham, Mass., a corporation of Massachusetts Original application October 31, 1951, Serial No. 254,147, now Patent No. 2,701,486, dated February 8, 1955. Divided and this application January 14, 1953, Serial No. 331,206

6 Claims. (Cl. 112—104)

This application constitutes a division of my copending application Serial No. 254,147, filed October 31, 1951.

The invention relates to a manually operated device for securing string loops or the like to various articles, the loop being suited for attaching a price ticket or identifying tag to the article.

In accordance with this invention a string loop may be secured to an article by passing one end of the string through or around a part of the article, retaining the end which has been advanced through or around the article and bring this end into engagement with another portion of the string beyond the edge of the article, then uniting the juxtaposed string portions with a small metal clip or the like. While the present device preferably includes a needle for passing the string through a piece of fabric, other string holders may be used which will present the end of the string for looping about a portion of other articles, for example, the rung of a chair.

Broadly the objects of the present invention are to provide a device of simple construction which may be operated with one hand leaving the other hand free to manipulate the string. A further object is to provide an improved needle and means for guiding the string to the needle which facilitates threading the string in the guiding means and in the needle.

A still further object is to provide means for feeding the aforementioned clips into position for securing the string in a loop and particularly for positively holding the clip in that position.

In one aspect the apparatus includes a hollow needle having an internal wall extending longitudinally of the needle through its tip and forming a passage therein, surfaces forming a slot which extends transversely of the needle and intersects the passage, and an elongate spring extending from the slot toward the tip of the needle, whereby the needle may be threaded by disposing the string in the slot and engaging the string between the spring and the internal wall of the needle. Preferably the needle has means forming a longitudinal slit in the wall of said passage, the slit communicating with the channel along a portion of the length of the passage so that the end of the string may extend outside the passage while an intermediate portion is drawn or urged or otherwise engaged under the spring. If desired a bridge element may be provided at the tip of the needle interrupting communication of the slit with the passage so that the string will not be displaced from the passage by use of the needle.

More specifically the needle is provided with a pin slidable in said passage between the slot and the tip of the needle, the aforesaid stop means being adapted to hold the needle support in its forward position with the needle beyond the frame so that a strand may be disposed in the transverse slot while the needle is in advanced position, and thereafter the pin may be moved in said passage to thread the strand in said passage. Preferably an actuating element for the pin is disposed outside the passage in the needle and the aforesaid frame is provided with a shoulder disposed in the path of the actuating element whereby when the support and needle are moved from forward position to rear position said shoulder engages the actuating element to produce relative forward movement of the pin between the transverse slot and the point of the needle thereby automatically to thread the strand in the needle. It is desirable that the pin be resiliently mounted in the passage and have a portion wider than the lateral opening of the passage whereby the pin is confined in the passage and yieldingly urged away from said lateral opening to clamp the strand in the passage.

In a further aspect the frame is provided with a magazine for the strand at the rear of the frame, spaced wall members forming a channel extending longitudinally of the frame, the forward end of the channel being disposed adjacent the needle, one of said wall members having at its rear end a slot therethrough extending forwardly at an angle to the channel and communicating laterally therewith, the channel and the slot forming a rearwardly extending finger, whereby a strand from the magazine may be disposed in the channel by hooking the strand in said slot around said finger and drawing the strand toward the needle.

Figure 2:
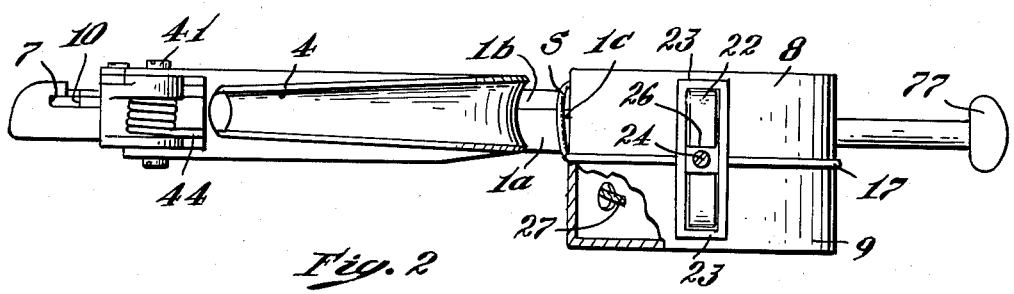
Figure 3:
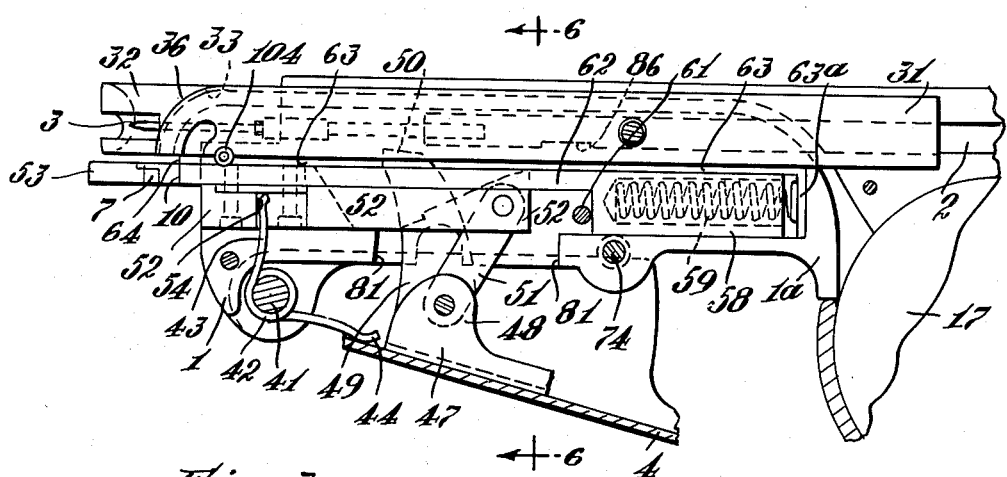
Figure 10:
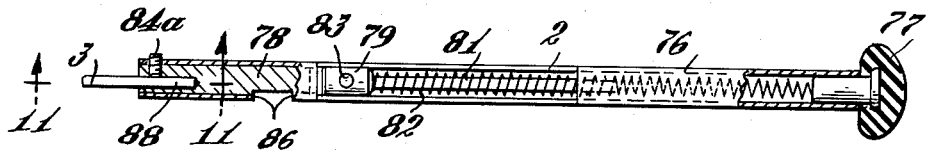
Figure 11:
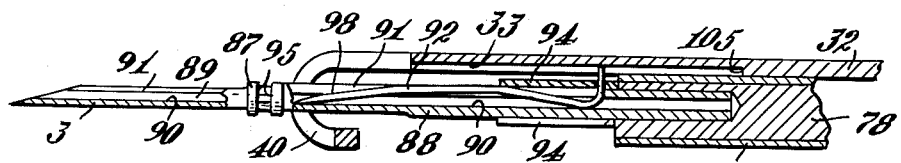
Figure 26:
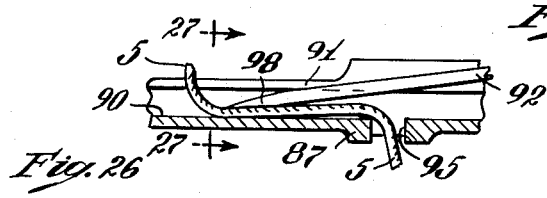
Figure 27:
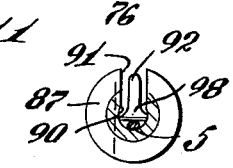
Figures 12, 13:
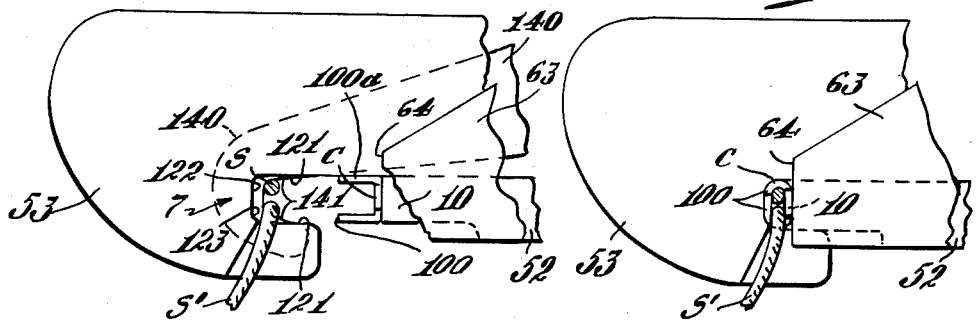
Figure 15:
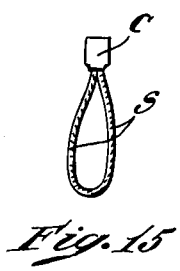
Figure 14:
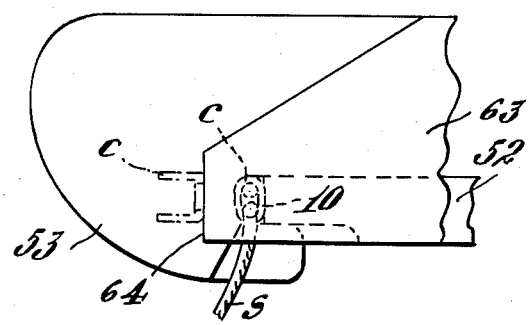
Figure 16:
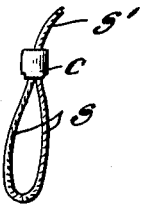

For the purpose of illustration a typical embodiment of the invention is shown in the accompanying drawings in which Fig. 1 is a side elevation of the device;
Fig. 2 is a bottom plan view of the device;
Fig. 3 is an enlarged sectional elevation;
Fig. 4 is a view like Fig. 1, part being broken away;
Fig. 5 is a sectional view like Fig. 3;
Fig. 6 is a section on line 6—6 of Fig. 3;
Fig. 7 is a section on line 7—7 of Fig 8 showing the clip feeding portion of the device;
Fig. 8 is a section on line 8—8 of Fig 7 showing the clip feeding portion of the device;
Fig. 9 is an isometric view of a strip of clips;
Fig. 10 is an enlarged side view of a needle carrying plunger shown partly in a vertical section on the diameter of the needle;
Fig. 11 is a section on line 11—11 of Fig. 10;
Figs. 12 to 14 are enlarged detail views;
Figs. 15 and 16 are side views of a looped strand;
Fig. 17 is an enlarged top plan view of the forward clip feeding and clinching portions of the device;
Figs. 18 to 19 are enlarged side elevations of the forward clip feeding and clinching portions of the device;
Fig. 20 is a section on line 20—20 of Fig. 18;
Fig. 21 is an enlarged view of a modified needle, parts being broken away;
Fig. 22 is a section on line 22—22 of Fig. 21;
Fig. 23 is a top plan view of a loop positioning device;
Fig. 24 is a side view of said device;
Fig. 25 is an enlarged view of the needle shown in Fig. 18;
Fig. 26 is an enlarged longitudinal section through the needle on the vertical diameter of the threading element, showing the threading element partly advanced from the position in Fig. 11; and
Fig. 27 is a section on line 27—27 of Fig. 26.

In the illustrative embodiment shown in the drawings the attaching device comprises a frame 1, a plunger 2 carrying a needle 3, a hand lever 4 operating a clip feeding mechanism 6 and a clinching and cutting die 7, and two magazines 8 and 9 respectively for holding a supply of clips C and string S.

The frame 1 has two portions 1a and 1b held together by screws 18 and 19 (Figs. 1 and 2) and forming three interior chambers 13, 14 and 15 (Fig. 6) running longitudinally of the frame. At the rear end of the frame a circular plate 17 fastened to the frame portion 1a by screws 18 and 19 provides a separating wall between the magazine caps 8 and 9. The left magazine cap 8 is attached to the left frame plate 1b by a hinge 21. The right magazine cap 9 is similarly attached to the right frame portion 1a. A spring detent 22 attached to the separating plate 17 by a screw 24 and clamping block 26, snaps into pockets 23 integrally formed at the bottom of the magazine caps. The string S is fed from within the magazine cap 9 through an opening 27 (Fig. 2). Clamped in the chamber 13 within the upper part of the frame 1 are a pair of guide plates 31 and 32 in which are opposed grooves forming a tube 33 through which a ribbon of clips C are fed from the left magazine 8 to the anvil 10. A tapered groove 34 at the rear of the right-hand frame portion 1a communicates between the clip magazine 8 and the rear end of groove 33 (Fig. 5). At the forward end of the guide plate 31 an extension 36 of the guide plate carrying the groove 33 curves toward the anvil 10. A feed pawl, to be hereinafter described, advances the ribbon of clips through the groove 33. The right-hand guide plate 32 carries a complementing groove and extends further forward to a hooked extension 40 comprising a guard for the needle 3 (Figs. 1 and 17).

The manually actuated lever 4 is pivoted to the frame 1 by a bolt 41. A spring 42 coiled about the bolt 41 has two extensions 43 and 44 engaging a shoulder 54 and the lever 4 respectively resiliently to urge the lever away from the frame. The lever has right and left integral guard plates 46 which telescope over the outside of the frame 1. Secured to the lever between the guard plates 46 is a yoke 47 having two upwardly extending arms 48 and 49. Pivotally secured between the arms 48 and 49 is a straight link 51. At its upper end the link 51 is pivotally connected to a sliding block 52. The block 52 slides in the chamber 15 formed within the two frame portions 1a and 1b (Figs. 3, 5 and 6) and has a portion 53 extending forward of the frame in which extension is formed the die 7. When the lever 4 is squeezed toward the frame the link 51 urges the block 52 rearwardly against the tension of the spring 42 which engages the shoulder 54 on the block 52. Also sliding in the chamber 15 is a second block 58 to the rear of the first block 52. A heavy coil spring 59 within the block 58 urges the block 58 against a stop 61. Extending forwardly from the block 58 is an elongate finger 62 which terminates in the anvil face 10. As shown in Fig. 6 the extension 62 and the block 52 nest in the chamber 15. Above the blocks 52 and 58 is a flat strip 63 having a flange 63a at its rear which abuts against the rear end of the chamber 15. The forward end of the strip 63 terminates in a knife or cutter 64 disposed beside the forward end of the extension 62 from the block 58. As shown in Fig. 3 the cutting edge of the knife 64 is even with the anvil 10.

Disposed between the left-hand guard plate 46 of the lever 4 and left frame portion 1b is a plate 71 pivotally attached at its forward end to a bell crank 6 by screw 72 and carrying a cam slot 73 at its rear end which is engaged by a pin 74 fixed to the left-hand guard plate 46. An ear 76 turned in from the guard plate 46 engages in a slot 77 extending lengthwise of the plate 71. When the lever 4 is squeezed toward the frame 1 the ear 76 raises the plate 71 camming the plate 71 rearwardly and thereby causing the bell crank 6 to swing about its pivot 106 (Figs. 1 and 19). The upper portion of the cam slot 73 produces all the movement of the plate 71 during the initial actuation of the hand lever 4. Thereafter the pin 74 dwells in the lower portion of the cam slot which is curved concentrically with the pivot 41 of the handle lever 4 and hence does not move the plate 71 on subsequent actuation of the lever. During this subsequent actuation the clinching and cutting die 7 is operated as will be described later.

As shown in Figs. 3, 5, 6 and 18, the right-hand arm 49 of the yoke 47 has an extension 50 passing through an opening 81 in the underside of the frame 1 and through the chamber 15 (Fig. 6) with its upper end normally disposed below the chamber 14 in which the plunger 2 reciprocates and slightly ahead of the end 72 of the plunger. As shown in Fig. 5 when the lever 4 is squeezed towards the frame the extension or stop 50 moves into the chamber 14 in front of the forward edge 72 of the plunger 2 to block forward movement of the plunger while the lever is actuated. On the other hand if the plunger is moved forward the stop 50 cannot enter the chamber 14 and hence prevents the lever from being actuated.

As shown in Figs. 10 and 11 the plunger 2 carrying the needle 3 comprises a hollow rectangular casing 76 having a button of rubber 77 at its rear end and a plug of metal 78 at its forward end. Between the plug and the bottom the rectangular casing 76 encloses a block 79 guided on a rod 81 and urged forwardly by a spring 82. The block 79 has a threaded hole 83 receiving a screw 84 (Fig. 1) which fixes the block 79 relative to the frame 1. The rear end of the needle 3 is anchored in the plug 78 by a set screw 84a. On the underside of the plunger 2 is a shallow recess 86 which as is shown in Fig. 18 is adapted to be engaged by the stop or extension 50 of the yoke arm 49. The plunger 2 is adapted to reciprocate between the rear position shown in Fig. 1 to the forward position shown in Fig. 18. When in the forward position the lever 4 may be actuated to insert the stop 50 in the recess 86 to hold the plunger in forward position.

As shown in Fig. 11 the needle 3 having a passage 90 comprises a thick rear portion 88 anchored in the block 78 and a slender forward portion 89 connected to the heavy portion by the joint 87. A slit 91 communicating with the passage extends longitudinally of the heavy portion 88, the joint 87 and the forward portion 89. As shown in Figs. 11 and 18 the joint is provided with a transverse slot 95 which opens into the passage 90. Sliding in the passage 90 is a pin 92 having a finger 93 extending from within the passage out through the slit 91. To the rear of the joint 87 a collar 94 slides on the rear thick portion 88. The finger 93 of the pin 92 is engaged in an opening 96 through the sleeve 94. As shown in Fig. 17 the sleeve 94 has an ear 97 secured at its rear end. When the plunger 2 is in its forward position the collar 94 may be reciprocated between the rear position shown in Fig. 11 and the forward position shown in Figs. 17 and 18 by manipulation of the ear 97 to move the tip 98 of the pin 92 from a position just to the rear of the joint 87 (Fig. 11) to a position at the tip of the needle 3 (Fig. 18). If the plunger 2 returns to its rear position the finger 93 of the pin engages an abutment 105 on the plate 32 urging the collar and pin forwardly in the needle. The pin 92 is less in diameter than the passage 90 by at least the cross section of the strand clamped beneath the tip 98 of the pin, and the tip 98 of the pin 92 is flattened to prevent the pin or thread from slipping through the longitudinal slit 91 as shown in Figs. 18 and 25.

An alternate form of needle 3a, shown in Figs 21 and 22 is provided with a bridge element 135 spanning the longitudinal slit 91 adjacent its tip. The bridge element serves to prevent the strand S from being dislodged from the slit while the needle is passed through an article of sheet material. As shown in Fig. 22 the bridge is bowed inwardly toward the slit to provide a trough in which the free end of the strand S nests so as to facilitate penetration of the material.

Whether the needle shown in Figs. 10 and 11 or that shown in Figs. 21 and 22 is used, the needle is advanced beyond the frame for threading or sewing. Either needle may be used with or without the bridge member of Figs. 21, 22.

The clip feeding mechanism shown in detail in Figs. 7, 8, 18 and 19 comprises the aforementioned bell crank 6 which includes a crank arm 101 and a bifurcated arm 102. Integrally formed with the crank arm 101 is a collar 103 extending laterally therefrom (Fig. 7). The collar 103 and the crank arm 101 are pivotally fixed to a stud 104 (Fig. 5) on the guide plate 31 by a screw 106 engaging in the stud. The bifurcated arm 102 is fixed to the collar 103 by a split sleeve 107. Extending radially from the split sleeve 107 are two clamping blocks 108 urged together by a screw 110 to reduce the diameter of the sleeve 107 and clamp the sleeve and the bifurcated arm 102 on the collar 103. Mounted on the bifurcated arm 102 is a pawl member 109 pivoted at 111 and having a finger 112 (Figs. 7 and 8). The finger 112 curves around the grooved extension 36 of the guide plate 31 and enters the track 33 formed by the grooves in the guide 31 and 32. A spring 113 yieldingly urges the finger 112 into the track.

As shown in Fig. 9 the clips C are formed in a U-shaped ribbon with complementary points 100 and 100a. The individual clips are spaced apart and joined by a lug portion 100b of reduced cross section. The clips are advanced by engagement of the finger 112 with a shoulder 100c formed by an indentation in the underside of each clip and by subsequent movement of the bell crank. When the bell crank 6 is swung by the plate 71 the finger 112 moves through a small arc sufficient to advance one clip from the end of the track 33 onto the anvil 10.

The anvil 10 comprising the flat end of the extension 62 from the sliding block 58 is disposed opposite the die 7 on an extension 53 from the sliding block 52 (Fig. 3). The die, shown enlarged in Figs. 12 to 14, comprises a socket having sides 121 spaced apart the width of the clip to be clinched and having a forward edge 122 opposed to the anvil face 10. As will be more fully described two juxtaposed portions of the strand S are disposed between the sides 121 preparatory to the clipping operation. Curved fillets 123 between the sides 121 and end 122 are designed to turn the points 100 and 100a of the clip C toward each other when the die 7 is moved rearwardly against the anvil 10, as shown in Fig. 13. The spring 59 which urges the anvil forward so that it lies flush with the cutting edge 64 of the knife 63 is of sufficient strength to hold the anvil in the normal positions shown in Figs. 12 and 13 against the force which the die 7 applies to the clip C. When the points 100 and 100a are clinched into juxtaposition with each other and compressed around the strands S the force applied by the die is then sufficient to urge the anvil rearwardly against the spring 59 permitting the rear face 122 of the die 7 to advance rearwardly of the fixed cutting edge 64 of the knife 63 so that the cutting edge 64 and the rear face 122 shear the strand S and the connecting lug 100b of the clip C. To shear both juxtaposed portions of the strand S (Fig. 15) both portions are held at right angles to the knife 63. If it is desired to leave one strand S' extending beyond the clip (Fig. 16) the strand S' is laid in a recess 126 at the side of the extension 53 so that as shown in Figs 12 to 14, the strand S' lies inside the cutting edge 64 as the die 7 passes the cutting blade 64.

If desired a strand gathering member 140, shown in Figs. 5, 12, 23 and 24, may be provided adjacent the clinching die 7. The gathering number has hook-forming edges 141 spaced closer together than the sides 121 and end 122 of the die so that the strand portions S and S' are held clear of the sides 121 and 122. The gathering member is attached to the sliding block 52, although it may be attached to or form a part of the die 7. In either case it moves with the die during the clinching operation and prevents the points 100 and 100a of the clip C from piercing or otherwise undesirably engaging the strands S and S' as they are clinched by the die edges 121 and 122. Since the gathering member 140 moves away from the anvil 10 with the die 7, it does not interfere with the manipulation of the strands S and S' on the anvil.

In an alternate embodiment of the invention shown in Figs. 18 and 19, the forward end of the guide plate 33 which carries the needle guard 40 also carries a portion 127 having a groove 128 in which is secured a spring finger 129. The free end 131 of the spring finger is located near the anvil 10 so that the free ends of the strand may be clipped in the groove under the finger before the strands are severed from the loop by the die 7 and the cutting edge 64.

As shown in Fig. 18 a number of waste ends may be collected under the spring finger until it is convenient to deposit them in a waste receptacle.

Preparatory to operation the magazine caps 8 and 9 are opened and a supply of string and clips is placed in their respective magazines. The strand of ribbon of clips C is manually fed through the groove 33 until the foremost clip strikes the finger 112 on the bell crank 6 at the forward end of the groove 33. Thereafter the finger 112 will operate with a ratchet action allowing the leading clips to pass to the end of the curved portion 36 forming part of the track 33, or one clip may be advanced past the finger 112 and the lever operated to feed the clips to the end of the groove 33. The string or strand S is then fed through the magazine opening 27, thence underneath the frame 1 (Fig. 2) in front of a forwardly facing frame abutment 1c, upwardly along the left-hand frame portion 1b, and then is engaged inside the finger 133 formed by the reces 134 in the left-hand frame portion 1b (Fig. 2). The strand is then drawn forward in a slot 136 (Fig. 17) formed by the spaced upper portions of the frame portions 1a and 1b and passed through an opening 40a through the guard 40. The plunger 2 is then urged forward by pressing the rubber pad 77 against any firm surface and the lever 4 actuated to advance the stop portion 50 of the yoke arm 49 into the recess 86 of the plunger 2, thereby locking the plunger in forward position with the needle advanced beyond the guard 40 (Fig. 11). The collar 94 is then retracted to the position shown in Fig. 11 in which the point 98 of the pin 92 is withdrawn to the rear of the joint 87. The end of the strand S is then laid in the transverse slot 95 of the joint so that it enters the longitudinal bore 90 of the needle 3 forwardly of the pin 92. The pressure on the lever 4 is then released allowing the plunger to be retracted by force of the spring 82 and carrying the needle rearwardly until the finger 93 of the pin 92 strikes the abutment 105 on the guide plate 32, urging the pin 92 forwardly in the needle 3 and threading the strand through the forward portion 89 of the needle 3. The strand is prevented from withdrawing from the needle by the flattened end 98 of the pin 92 which bridges the walls of the bore 90 and clamps the strand against the bore of the needle as shown in Figs. 26 and 27.

The operation of the device is as follows. The plunger 2 is advanced by pressure on the button 77 and the lever is actuated to engage the stop 50 in the slot or recess 86 and hold the needle 3 in exposed position in advance of the guard 40. While the device is held in one hand the needle is then inserted through the eye E of a tag T and thence through a piece of fabric F as shown in Fig. 5. When the needle has passed the strand through the ticket and fabric the end of the strand is gripped with the fingers of the free hand and a suitable length of string is drawn from the magazine through the needle. At the same time the pressure on the lever is released disengaging the stop 50 from the recess 86 and allowing the plunger to retract and withdraw tthe needle within the guard 40, the guard 40 preventing the fabric from following the needle. The portions of the strand on both sides of the fabric and ticket are then engaged in the die 7 in juxtaposition (Figs. 5 and 12). The lever 4 is again actuated to perform three steps. By its initial movement the lever causes the cam plate 71 to swing the bell crank and feed one clip onto the anvil 10. Because the cam plate dwells on further movement of the lever the finger 112 on the bell crank rests in an advanced position in which it holds the foremost clip on the anvil. Second, further movement of the lever brings the die 53 into engagement with the clip C clinching the points of the clip C around the juxtaposed strands S. Further compression of the lever 4 drives the die sufficiently to move the anvil rearwardly against the force of the heavy spring 59 and bring the die past the knife edge 64 thereby severing the loop from the strand, and the clinched clip from the connected series of clips.

By virtue of the present invention the operator is enabled to hold the tag attaching device in one hand while performing the above described operations of locking the needle in advanced position, clipping the string in a loop, and cutting the loop from the string. These operations are further facilitated by the novel string and clip feeding mechanisms.

It should be understood that the present disclosure is for the purpose of illustration only and that this invention includes all modifications and equivalents which fall within the scope of the appended claims.

I claim:

1. In a device for looping a strand through sheet material, a needle for passing the strand through the material, said needle having an internal wall forming a longitudinal passage extending through the tip of the needle, surfaces extending transversely of the needle and forming a slot intersecting said passage, and an elongate threading element in said passage, said threading element being adapted to slide between a rear position in which its end is to the rear of the aforesaid slot and a forward position in which its end is near the tip of the needle said end being yieldingly biased toward said internal wall, whereby the strand may be threaded in said passage by disposing the strand in said slot and sliding the element through the slot toward the tip of the needle so that said end clamps the strand against said wall thereby drawing the strand toward said tip and confining a portion of the strand in said passage between said end and wall.

2. In a device for looping a strand through sheet material, a frame, movably mounted on the frame a plunger adapted to carry a needle for passing the strand through the material, said plunger being movable between a retracted position and an advanced position, said needle having a longitudinal passage extending through the tip of the needle and transversely of the needle a slot intersecting said passage, a threading element slidable in said passage between a rear position to the rear of said slot and a forward position in front of said slot adjacent the tip of the needle, a sliding member outside the needle for moving said element between said positions, said frame having an abutment in the path of said member when said element is in rear position, whereby the strand may be threaded through said passage by disposing the strand in said slot while said element is in rear position and causing the plunger to move toward retracted position so that said abutment engages said member and urges the threading element toward forward position.

3. In a device for looping a strand through sheet material, a needle for passing the strand through the material, said needle having an internal wall forming a longitudinal passage extending through the tip of the needle, surfaces extending transversely of the needle and forming a slot intersecting said passage, and an elongate threading element in said passage adapted to slide between a rear position in which its end is to the rear of the aforesaid slot and a forward position in which its end is near the tip of the needle, said element being less in diameter than said passage so as to admit a strand between the element and passage wall and being biased toward said wall, whereby the strand may be threaded in said passage by disposing the strand in said slot and sliding the element through the slot toward the tip of the needle, thereby drawing the strand toward said tip and confining a portion of the strand in said passage.

4. In a device for looping a strand through sheet material, a needle for passing the strand through the material, said needle having an internal wall forming a longitudinal passage extending through the tip of the needle, surfaces extending transversely of the needle and forming a slot intersecting said passage, and an elongate threading element in said passage adapted to slide between a rear position in which its end is to the rear of the aforesaid slot and a forward position in which its end is near the tip of the needle, said element being less in cross-section than said passage by at least the compressed cross-section of one strand and being biased yieldingly to urge said end toward said wall whereby the strand may be threaded in said passage by disposing the strand in said slot and sliding the element through the slot toward the tip of the needle so that said end clamps the strand against said wall thereby drawing the strand toward said tip and confining a portion of the strand in said passage.

5. In a device for looping a strand through sheet material, a needle for passing the strand through the material, said needle having a curved internal wall forming a longitudinal passage extending through the tip of the needle, surfaces extending transversely of the needle and forming a slot intersecting said passage, and an elongate threading element in said passage adapted to slide between a rear position in which its end is to the rear of the aforesaid slot and a forward position in which its end is near the tip of the needle, said end being yieldingly biased toward said internal wall whereby the strand may be threaded in said passage by disposing the strand in said slot and sliding the element through the slot toward the tip of the needle, thereby drawing the strand toward said tip and confining a portion of the strand in said passage between said end and wall, and said end being flattened to bridge said wall and prevent displacement of the strand from between said end and wall.

6. In a device for looping a strand through sheet material, a needle for passing the strand through the material, said needle having a curved internal wall forming a longitudinal passage extending through the tip of the needle, surfaces extending transversely of the needle and forming a slot intersecting said passage, said needle wall having a longitudinal slit communicating with said transverse slot, and an elongate threading element in said passage, said element being less in cross-section than said passage by at least the compressed cross-section of one strand and being biased yieldingly to urge its forward end toward said wall, said forward end being flattened to bridge said wall and hold a portion of said strand between said end and wall after said strand is disposed in said slot and engaged under said element.

References Cited in the file of this patent

UNITED STATES PATENTS

| | | |
|---|---|---|
| 2,069,878 | Flood | Feb. 9, 1937 |
| 2,119,228 | Flood | May 31, 1938 |
| 2,479,017 | Merson et al. | Aug. 16, 1949 |